United States Patent [19]

Stoilov et al.

[11] Patent Number: 5,332,634
[45] Date of Patent: Jul. 26, 1994

[54] METHOD OF MAKING LEAD ELECTRODES

[75] Inventors: Georgi T. Stoilov; Vladimir G. Stoilov, both of Sofia, Bulgaria; Boiko G. Stoilov, Malaga, Spain; Christo T. Chervenkov; Pavel A. Lazov, both of Sofia, Bulgaria

[73] Assignee: Kamina, Ltd., Sofia, Bulgaria

[21] Appl. No.: 960,132

[22] Filed: Oct. 13, 1992

[51] Int. Cl.$^5$ .............................................. H01M 4/68
[52] U.S. Cl. ................................. 429/234; 29/623.5; 141/32
[58] Field of Search ............... 429/211, 225, 227, 233, 429/234, 245; 29/623.5; 141/32

[56] References Cited

U.S. PATENT DOCUMENTS

| | | | |
|---|---|---|---|
| 4,021,597 | 5/1977 | Burant | 429/225 |
| 4,148,978 | 4/1979 | Winsel et al. | 429/217 |
| 4,221,854 | 9/1980 | Hammar et al. | 429/234 |
| 4,238,557 | 12/1980 | Schulte et al. | |
| 4,782,585 | 11/1988 | Kobayashi et al. | 29/623.5 |

FOREIGN PATENT DOCUMENTS

| | | | |
|---|---|---|---|
| 28429 | 4/1980 | Bulgaria | H01M 4/14 |
| 29000 | 8/1980 | Bulgaria | H01M 4/20 |

OTHER PUBLICATIONS

N. A. Hampson et al., "The Electrochemistry of the Porous Lead Electrode in Sulfuric Acid" Journal of Power Sources 6 (1981) pp. 101–120.

N. Munichandraiah et al., "Insoluble Anode of Porous Lead Dioxide for Electrosynthesis: Preparation and Characterization", Journal of Applied Electrochemistry 17 (1987) pp. 22–32.

Edward Ghali et al., "Electrodeposition of Lead from Aqueous Acetate and Chloride Solutions", Metallurgical Transactions, vol. 16B (1985) pp. 489–496.

F. P. Haver et al., "Aqueous Electrolysis of Lead Chloride", Bureau of Mines Report of Investigation No. 8276 from U.S. Dept. Interior (1978) pp. 1–11.

Provisionally Published German Federal Republic Patent Application No. 26 56 506, filed Dec. 14, 1976, "Positive Elektrode fur Bliakkumulatoren".

Provisionally Published German Federal Republic Patent Application No. 27 15 628, filed Apr. 7, 1977, "Positive Elektrode fur Bleiakkumulatoren".

Provisionally Published German Federal Republic Patent Application No. 28 49 311, filed Nov. 14, 1978, "Verhfahren zur Herstellung Positives und Negative Elektroden fur Bleiakkumulatoren".

*Primary Examiner*—José G. Dees
*Assistant Examiner*—Samuel Barts
*Attorney, Agent, or Firm*—Skadden, Arps, Slate, Meagher & Flom

[57] ABSTRACT

A method for making porous lead dioxide electrodes having a relatively large active surface area and long service life is disclosed. The electrodes employ a grid which is coated first with a thin layer of nickel and then with a thin layer of lead. A paste containing a halogenated lead compound is applied over the lead and successively reduced and oxidized to form an active mass of porous lead dioxide. The finished porous lead dioxide electrode is suitable for use in storage batteries.

10 Claims, 2 Drawing Sheets

METHOD OF MAKING LEAD ELECTRODES

FIELD OF THE INVENTION

The invention relates to a method for making electrodes for lead accumulators. More particularly, the invention relates to porous lead electrodes which are suitable for use in the accumulator cells. The electrodes have a porous active mass which has a large active surface area per unit weight thereby providing greater power per unit weight of the accumulator as compared to prior art accumulators.

BACKGROUND OF THE INVENTION

An electrode is a device adapted to pass electric current into and out of an electrochemical cell of an accumulator. Each electrode has an active mass of material, which provides a surface for receiving or donating electrons. The trend in electrode design today is towards electrodes having a porous active mass which presents a larger surface area per unit weight of active mass, resulting in reduced weight and volume requirements for the electrodes overall.

A known method for making lead electrodes involves covering a metallic grid with an active mass of lead containing polytetrafluoroethylene dispersed as a colloid in the active mass. In that process, polytetrafluoroethylene is mixed with water to form an aqueous suspension. The suspension is subsequently mixed with powdered lead oxide to form a paste containing from about 20% to about 40% water by weight. The paste is converted to the active mass of the electrode.

However, the electrodes produced by that previously known method have a relatively small active surface area. Also, the active mass forms only a weak electrical connection with the metallic grid.

Therefore, there is a need for making lead electrodes with a porous active mass, which has a large active surface area and which strengthens the electrical connection between the active mass and a grid. Such a porous lead electrode would lead to electrochemical cells and accumulators which produce more power per unit of weight and also present very low electrical resistance. Accordingly, an accumulator constructed with such electrodes could withstand relatively large surges in power demand and would be useful for powering electric hoists, electric cars, electric trucks and starter motors for internal combustion engines. Accumulators employing such electrodes would also weigh less because they are capable of producing more energy for a given weight.

There exists a need for making porous lead electrodes using simpler technology and producing less waste to pollute the environment than previously known processes. Ideally, such a process would also be suitable for automation so that workers would encounter less exposure to toxic materials such as lead metal.

SUMMARY OF THE INVENTION

A porous lead electrode in accordance with the present invention is advantageously made by a method, comprising the steps of the following sequence:

providing a non-metallic grid, such as one of plastic or ceramic;

covering the grid with an electrically conductive, acid resistant metal other than lead, such as of nickel;

covering the metal layer with a layer of lead;

covering the layer of lead with a paste containing a halogenated lead compound such as lead chloride;

submerging the paste covered grid in an electrically conductive solution and providing a conductive metal anode in the solution at a second electrical potential which is different from that of the paste-covered grid; and reducing the halogenated lead paste to form a highly porous elemental lead layer.

The porous lead electrode is then submerged in a bath of dilute sulfuric acid solution and is electrically oxidized to produce a porous lead dioxide.

The paste covering is preferably lead chloride, but may be lead fluoride, lead bromide, lead iodide and mixtures thereof. The paste is formed by adding distilled water to lead chloride.

The conductive metal anode for reducing lead chloride is preferably aluminum or an aluminum alloy. It may also be magnesium or a magnesium alloy.

In the most preferred form of the present invention, the grid is a plastic grid having a coating of a very thin nickel layer, then covering the nickel layer with a thin layer of lead, next applying the paste, and then carrying out the above listed steps.

Further objects, features and advantages of the invention will become apparent from the following description and drawings.

DETAILED DESCRIPTION OF THE PREFERRED EMBODIMENT

Figure 1:
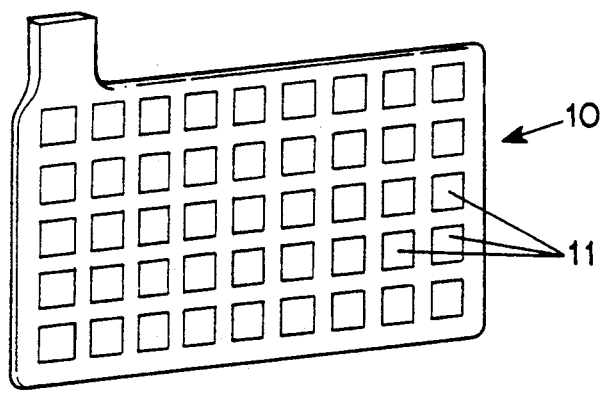
FIG. 1 is a perspective view of an exemplary plastic grid, which may be used in the practice of the method of this invention for making a porous lead electrode.
Figure 2:
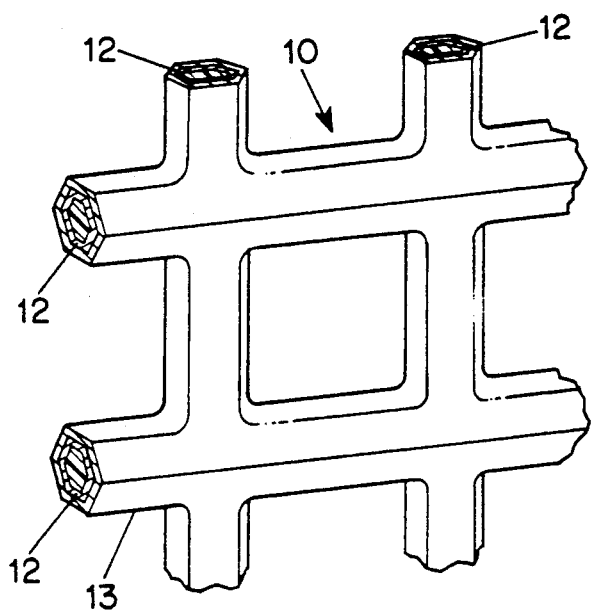
FIG. 2 is an enlarged cross-sectional of the grid of FIG. 1 with the electrically acid resistant metal layer (nickel) and a thin lead layer thereon.

A non-metallic (plastic or ceramic) grid 10 shown in FIG. 1 is provided in the form of plurality of cylindrical rod-like elements with an enlarged section shown in FIG. 2. The grid provides suitable structural support holding the paste of lead chloride during the manufacturing process and strengthens the electrode during its use.

The grid 10 will also determine the proportions of the finished lead electrode. A preferred grid is depicted in FIG. 1. Other shapes and configurations of grids may optionally be employed. It is cast in the form of a plurality of rod-like elements. The grid is of a width of about 1.6 mm. The rod-like elements have a cross-section of about 1 mm and it is preferably polygonal in cross-section, but the elements may also have other cross-sectional configurations.

Grid holes 11 defined by the rod-like elements must be sufficiently small so that the subsequently applied paste occludes the grid holes completely. Overall dimensions for a typical grid are 143×125 mm.

Synthetic resins are preferred materials for forming the grid. The principle attributes of a suitable plastic are structural strength, low density and its chemical stability when in contact with sulfuric acid and lead chloride. Polyvinyl chloride and polyethylene chloride are preferred plastics for the grid. Alternatively, the grid may be constructed of a ceramic material.

A metal layer of an electrically conductive metal covers the grid surface. The metal layer need only be thick enough to provide a base for a subsequent layer of lead, which is described below. Metals suitable for inclusion in or use as the metal layer must demonstrate high electrical conductivity and chemical stability in the presence of a concentrated acid, such as sulfuric acid, under reducing conditions. A number of elemental metals and metal alloys are suitable, such as nickel, aluminum and magnesium. However, when the grid is composed of plastic, it is preferred that the metal layer be nickel and have a thickness of about 5 microns.

The metal layer may be applied by any well known metal deposition and coating processes, and preferably by a vacuum deposition process.

FIG. 2 illustrates the manner in which a metal layer 12 covers the entire surface of the grid 10.

After the electric conductive acid resistant metal coated grid 10 is prepared, a thin layer of lead 13 is applied over the metal layer 12. The layer of lead 13 may be applied by any known process, although application by vacuum deposition is preferred. The layer of lead 13 preferably has a thickness of about 200 microns.

A paste 14 which is a mixture of halogenated lead compound, such as lead chloride, with distilled water is applied to the grid 10, as by pressing, so that the paste covers both sides of the grid 10 and occludes the grid holes 11. As a result of the application to the holes 11, the thickness of the paste layer 14 is about 1.6 mm. The halogenated lead compound may comprise lead fluoride, lead iodide or lead bromide in addition to the preferred lead chloride.

The paste 14 is applied in a quantity sufficiently to totally occlude the grid holes 11 and to cover the coating of lead 13. It is preferably applied by pressing it against the grid.

The paste 14 is made by mixing powdered lead chloride with sufficient distilled water to produce a paste having a workable consistency. The powdered lead chloride should be substantially free of other metals and salts.

About 70 to 80 parts of lead chloride and about 20 to 30 parts of distilled water by weight has been found to be satisfactory to produce a paste having the desired consistency. Distilled water is preferred to minimize the possibility of contamination by salts other than chloride salts.

A preferred method of obtaining suitable powdered lead chloride is to combine lead acetate which is commercially available as a powder with distilled water in a ratio of about 1 kilogram to 10 liters. Concentrated hydrochloric acid is added to the resultant solution at room temperature while stirring to produce lead chloride that precipitates in a solid form that is recoverable by filtration.

Figure 3A:
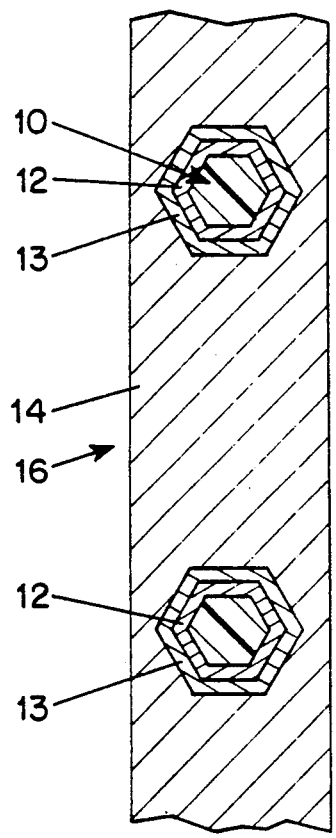
FIG. 3A is an enlarged cross-sectional view taken along line 3A—3A of FIG. 3.
Figure 3:
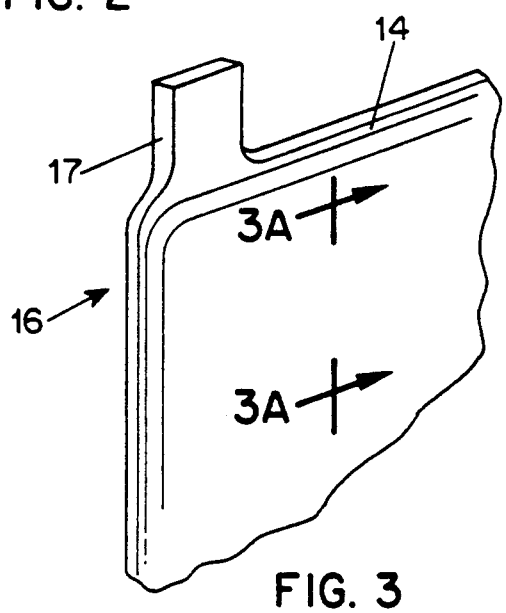
FIG. 3 is a view of a portion of the grid of FIG. 1 with an electrically conductive metal layer, and a layer of lead, and covered with a lead chloride paste.

FIG. 3 shows a perspective view of a paste o covered grid 16 having an extension 17 and FIG. 3A is a partial view of the paste covered grid 16 to illustrate the coating of paste.

Figure 4:
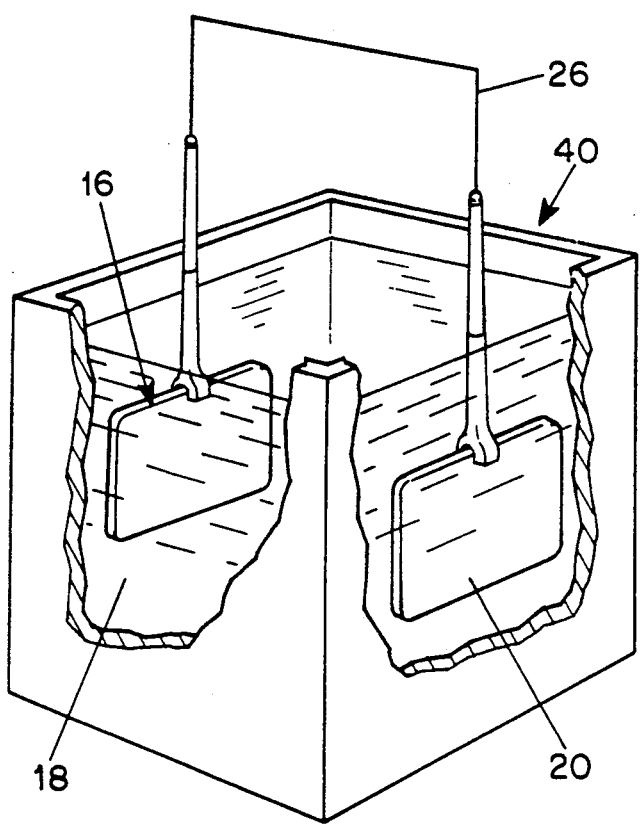
FIG. 4 shows a bath in which the grid of FIG. 3 is reduced to form a porous lead layer by the method of the present invention.

FIG. 4 illustrates a non-metallic galvanic cell 40, containing distilled water 18 with the paste covered grid 10 and an anode 20 submerged in it. Because the lead chloride paste is somewhat soluble in water at room temperature, some of the lead chloride in the paste will dissociate, thereby contributing additional chloride anions to the distilled water. The latter becomes an electrically conductive solution. About 3.0 percent by weight of sodium chloride may be added to the obtained solution to speed the reduction of the lead chloride to elemental lead. The addition of larger amounts of salts is not recommended as they may cause the lead chloride to reduce more rapidly at the surface of the paste than at the inner portions of the paste resulting in an incomplete reduction and an electrode of poor quality.

Anode 20 is fabricated of aluminum. It is electrically connected (through a conductor) to the paste covered grid 16. Magnesium, nickel, iron, chrome, zinc, manganese and beryllium, and alloys of aluminum and of magnesium, as well as an alloy of aluminum, magnesium and copper, a preferred anode material, can serve as the anode 20.

The electric chemical reaction between the paste-covered grid 16, solution 18 and anode 20 reduces the lead chloride (the halogenated lead compound) to form a porous elemental lead layer 22. The porous lead layer is largely comprised of crystals of lead 22, such as rod-like or acicular lead crystals.

Precautions must be taken to safely dispose of chlorine gas that is released in the course of the electrically chemical reaction.

It is important to allow the reduction of the paste to proceed to completion. Three physical indications can be monitored to determine when the reduction is complete. First the color of the paste turns from white to grey. Second, an exothermic release of heat from the reduction reaction suspends when the reaction completes. Third, bubbles caused by the production of chlorine gas at the anode cease to be generated when the reaction reaches completion. Typically, the paste-covered grid about 143 mm long by 125 mm wide will require about 18 to 36 hours to completely reduce.

The highly porous lead electrode so made is further processed to make a porous lead dioxide electrode. The porous lead electrode 24 is submerged in a dilute sulfuric acid solution and electrically oxidized by an external source of electrical current to convert to the porous lead dioxide layer. An anode from which electrons are withdrawn is also submerged in the dilute sulfuric acid solution.

Figure 5A:
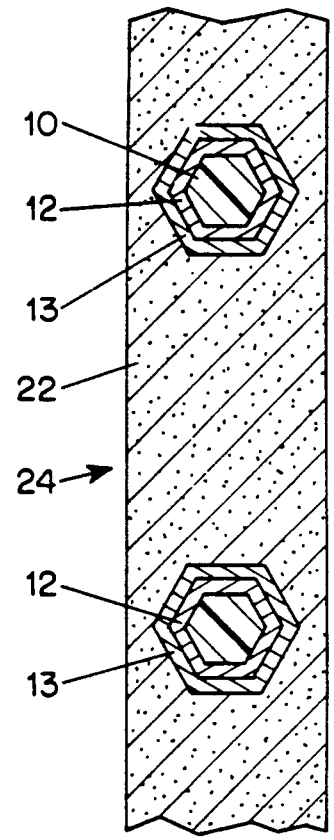
FIG. 5A is a cross-sectional view taken along line 5A—5A of FIG. 5 of the porous lead electrode.
Figure 5:
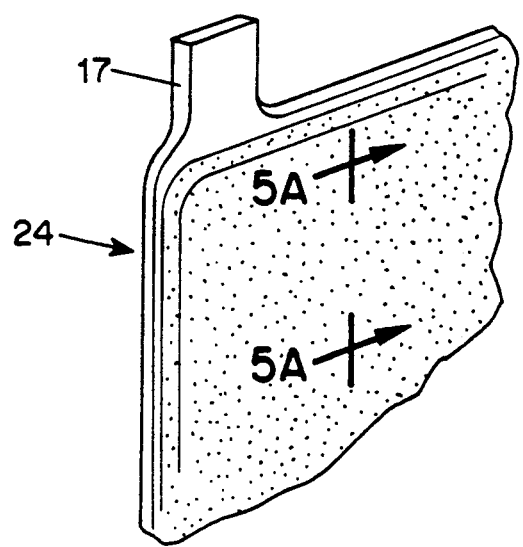
FIG. 5 is a porous lead electrode produced by the method of the present invention.

Referring to FIG. 5, a porous lead electrode 24 made in accordance with the method of the present invention includes a plastic grid 10, which is covered by a thin layer of electrically conductive acid resistant metal 12, a thin layer of lead 13, which is in electric contact with a porous lead layer 22. The porous lead electrode has a relatively large surface area which is capable of passing a great deal of electrical current, yet is relatively small in size and light in weight. The porous lead layer 22 has a specific surface area in the range of about 50 to 80 sq.m/g. The porous lead electrode 24 represents an advance in the art of producing electrodes. Having less internal resistance and a larger active surface, the improved electrode is capable of accepting a larger electric charge.

From the foregoing, further embodiments will become apparent to those skilled in the art without departing from the spirit and scope of the invention. Accordingly, it is not intended that the invention be considered as being limited except as may be made necessary by the claims.

What is claimed is:

1. A method for making a porous lead electrode, which comprises:
   providing a non-metallic grid;
   coating the non-metallic grid with a very thin layer of conductive acid resistant base metal;
   coating the conductive acid resistant base metal layer of the grid with a thin layer of lead;
   covering the layer of lead coated on the conductive acid resistant base metal layer with a paste containing a halogenated lead compound;
   submerging the paste-covered grid solution;
   providing an anode in the solution which is electrically coupled to the paste covered grid; and
   reducing the halogenated lead compound to form an electrode having a porous elemental crystalline lead layer.

2. The method of claim 1, wherein the non-metallic grid is made from a material selected from the group consisting of plastic material and ceramic material.

3. The method of claim 2, wherein the halogenated lead compound is a compound selected from one or more of the group consisting of lead chloride, lead fluoride, lead bromide, lead iodide.

4. The method of claim 2, wherein the halogenated lead compound is lead chloride.

5. The method of claim 2, wherein the metal layer is nickel.

6. The method of claim 2, wherein the anode is a metal selected from the group consisting of aluminum, aluminum alloy, magnesium, magnesium alloy, and mixture of aluminum and magnesium.

7. The method of claim 2, and a step of submerging the porous lead electrode in a sulfuric acid solution and electrically oxidizing the porous lead electrode to make a porous lead dioxide electrode.

8. The method of claim 2, wherein the thin metal layer is nickel; the halogenated lead compound is lead chloride; the conductive metal electrode is an aluminum and magnesium alloy; and the highly porous layer of elemental lead is composed of a large quantity of rod-like lead crystals.

9. A porous lead electrode made by a process comprising:
   providing a plastic grid;
   coating the plastic grid with a very thin layer of conductive acid resistant base metal;
   coating the conductive acid resistant base metal layer of the grid with a thin layer of lead;
   covering the layer of lead coated on the conductive acid resistant base metal layer with a paste containing a halogenated lead compound;
   submerging the paste-covered grid in an electrically conductive solution;
   providing an anode in the solution which is electrically coupled to the paste covered grid; and
   reducing the halogenated lead compound to form an electrode having a porous elemental lead layer.

10. A porous lead dioxide electrode made by a process comprising:
    providing a plastic grid;
    coating the plastic grid with a very thin layer of conductive acid resistant base metal;
    coating the conductive acid resistant base metal layer of the grid with a thin layer of lead;
    covering the layer of lead coated on the conductive acid resistant base metal layer with a paste containing a halogenated lead compound;
    submerging the paste-covered grid in an electrically conductive solution;
    providing an anode in the solution which is electrically coupled to the paste covered grid; and
    reducing the halogenated lead compound to form a porous elemental lead layer; and thereafter
    submerging the porous lead electrode in a hydrochloric acid solution and electrically oxidizing the porous lead electrode to form a porous lead dioxide electrode.

* * * * *